Sept. 29, 1942.  R. J. IFIELD  2,296,929
VARIABLE SPEED MECHANISM
Filed July 24, 1941  4 Sheets-Sheet 2
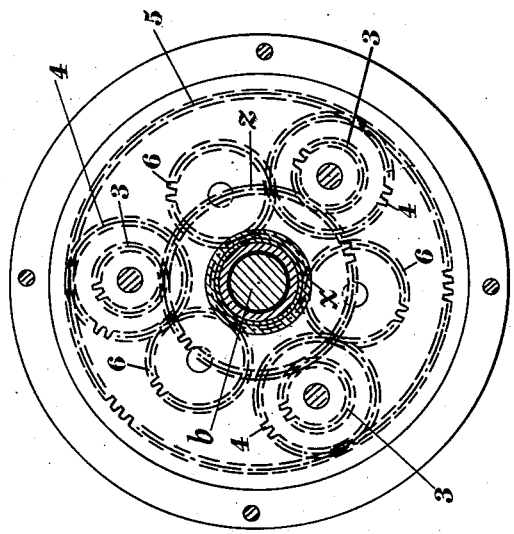
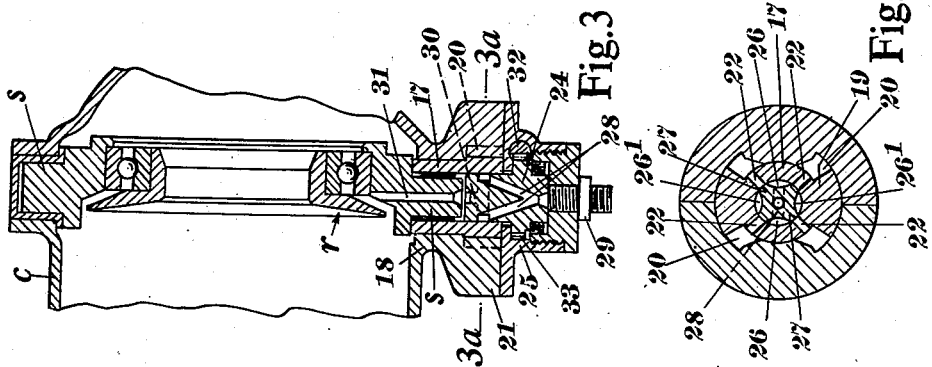
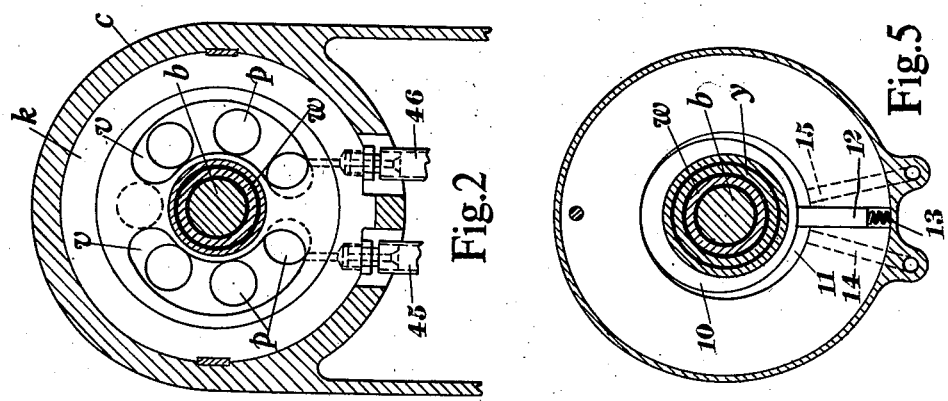
Inventor
R. J. Ifield
by: Glascock Downing & Seebold
Attys.

Sept. 29, 1942.   R. J. IFIELD   2,296,929
VARIABLE SPEED MECHANISM
Filed July 24, 1941   4 Sheets-Sheet 3

Inventor
R. J. Ifield
By: Glascock Downing & Seebold
Attys.

Sept. 29, 1942.  R. J. IFIELD  2,296,929
VARIABLE SPEED MECHANISM
Filed July 24, 1941  4 Sheets-Sheet 4

Inventor
R. J. Ifield
By: Glascock Downing Seibel
Attys.

Patented Sept. 29, 1942

2,296,929

UNITED STATES PATENT OFFICE 2,296,929

VARIABLE SPEED MECHANISM

Richard Joseph Ifield, Elmdon, Heath, Solihull, England, assignor to Joseph Lucas Limited, Birmingham, England Application July 24, 1941, Serial No. 403,926
In Great Britain August 13, 1940

7 Claims. (Cl. 74—293)

This invention has for its object to provide improved means for effecting a variable-speed connection between driving and driven members of a mechanically propelled vehicle or any other mechanism.

The invention comprises the combination of an epicyclic gearing, a pair of complementary rotary pumps each having a plurality of reciprocatory plungers, and means for varying the strokes of the plungers, one of the pumps being associated with one part of the epicyclic gearing and the other pump with another part of the gearing.

In the accompanying sheets of explanatory drawings:

Figure 2 is a cross section on the line 2—2 (Figure 1).

Figure 3 is a cross section on the line 3—3 (Figure 1).

Figure 3a is a section on the line 3a—3a (Figure 3).

Figure 4 is a cross section on the line 4—4 (Figure 1).

Figure 5 is a cross section on the line 5—5 (Figure 1).

Figure 1:
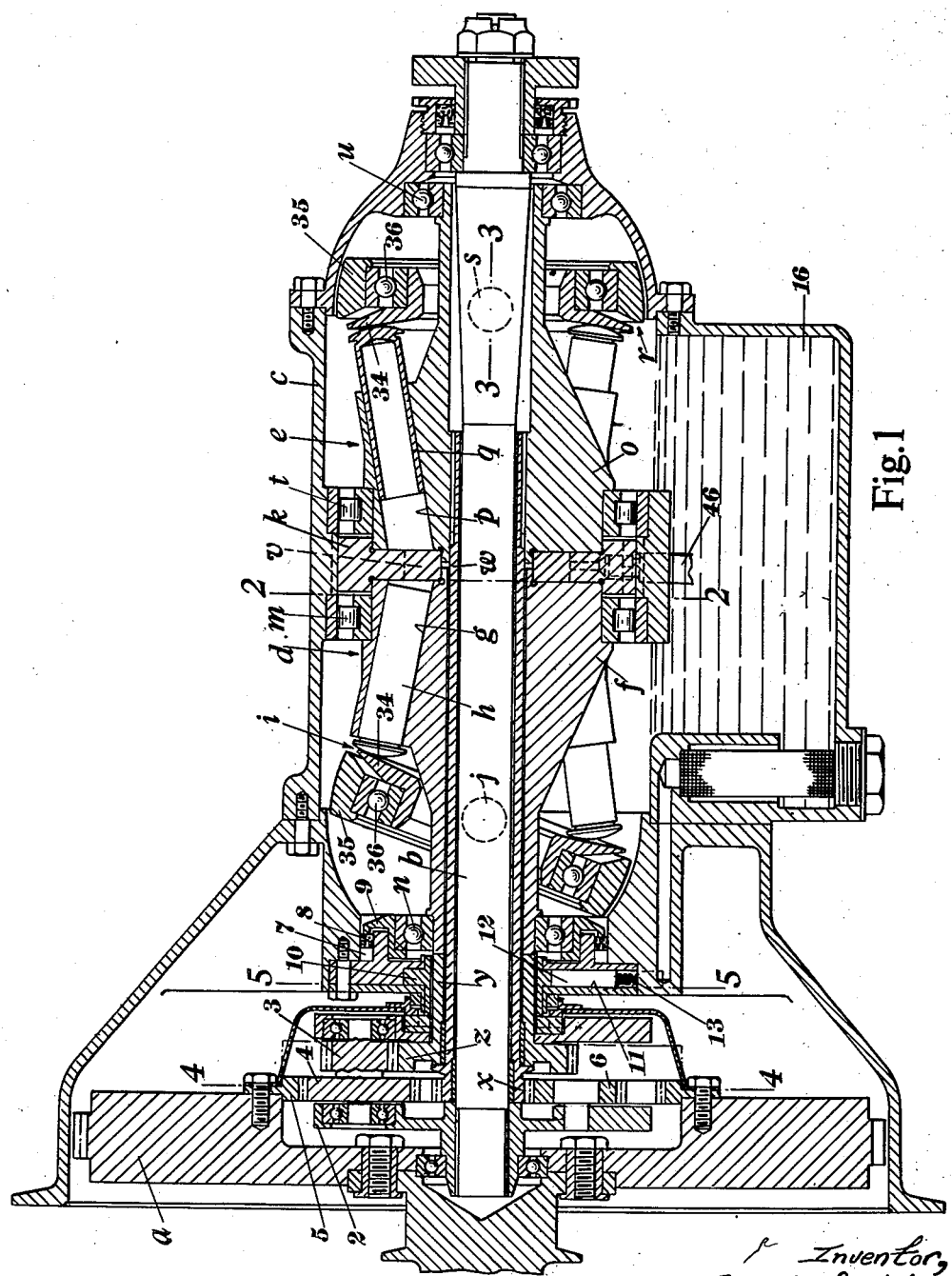
Figure 1 is a longitudinal section illustrating one form of variable speed mechanism constructed in accordance with the invention.

Referring to Figure 1, this illustrates a mechanism suitable for use in the power transmission system of a mechanically propelled vehicle, but essentially the same mechanism can be employed for any other purpose in which it is required to effect a variable-ratio connection between driving and driven members of a power transmitting mechanism. As shown in Figure 1, the driving member is a wheel $a$, which may be the flywheel of an internal combustion engine, and the driven member is a shaft $b$, the two members being arranged coaxially with each other, and the driven member being mounted in and adapted to extend from one end of a casing, $c$ which at the other end encloses the driving member. Also mounted within the casing $c$ are two similar complementary pumps $d$, $e$, which are situated in coaxial relationship with each other and with the driving and driven members $a$, $b$, the driven member being arranged to pass through the pumps. The pump $d$ comprises a rotary body part in the form of a cylinder block $f$ provided with a plurality of longitudinal bores $g$ containing reciprocatory plungers $h$, and associated with the outer ends of the plungers (which project from one end of the block) is an annular swash plate $i$ having a pair of diametrically opposite trunnions as $j$ whereby it is pivotally mounted in the casing $c$ around the driven shaft $b$. The inclination of the swash plate $i$ is adjustable by any convenient means. The face of the block $f$ at the end remote from the swash plate $i$ bears against one side of a ported non-rotatable abutment $k$ mounted in the casing $c$, and this end of the block is supported by a ball or roller bearing $m$, the other end being supported by a ball or roller bearing $n$. At the opposite side of the abutment $k$ is situated the other and similar pump $e$. This comprises a rotary body part in the form of a cylinder block $o$ provided with longitudinal bores $p$ containing reciprocatory plungers $q$, and associated with the outer ends of these plungers (which project from the end of the block remote from the abutment) is an annular swash plate $r$ having a pair of diametrically opposite trunnions $s$ whereby it is pivotally mounted in the casing $c$ around the driven shaft $b$, the inclination of this swash plate being adjustable by any convenient means. The cylinder block $o$ is supported by ball or roller bearings $t$, $u$, and the face of this block at the end remote from the swash plate $r$ bears against the abutment $k$.

The abutment $k$ is provided with a pair of kidney-shaped ports $v$ (Figure 2) the ends of which are separated by portions equal or substantially equal in diameter to the diameter of the plunger bores $g$, $p$ in the cylinder blocks $f$, $o$. In this example each cylinder block is provided with an odd number of bores as shown in Figure 2.

When in action the pump plungers $h$, $q$ serve to effect displacement of liquid between the bores $g$, $p$ in the two cylinder blocks $f$, $o$. That is to say, while liquid is being displaced from $f$ to $o$ through one of the ports $v$ liquid is being displaced from $o$ to $f$ through the other port, or vice versa.

Preferably, and as shown, the bores $g$, $p$ are inclined to the axis of the pumps $d$, $e$, the adjacent ends of the bores being nearer to this axis than the other ends. Also the plungers $h$, $q$ are of hollow form, their inner ends being open and their outer ends closed.

The cylinder block $o$ is secured to one end of a hollow shaft $w$ which is rotatable on the driven shaft $b$, the other end of the hollow shaft being situated near the driving wheel $a$, and having formed on it a sun pinion $x$. The other cylinder block $f$ is secured to one end of a short sleeve $y$ which is rotatable on the hollow shaft $w$ and on which is formed a sun pinion $z$, the latter being situated adjacent to and of larger diameter than the sun pinion $x$ as shown. In association with the sun pinions $x$, $z$, is arranged a rotary planet pinion carrier $2$ secured to the driven shaft $b$. On this carrier are mounted two groups of planet pinions. One of these groups is composed of a plurality of twin pinions $3$, $4$, of different diameters. The smaller pinions $3$ engage the larger sun pinion $z$, and the larger pinions $4$ engage an internally toothed annulus $5$ on the driving member $a$. The planet pinions $6$ of the other group engage the smaller sun pinion $x$ and the larger planet pinions $4$ of the first mentioned group.

Power is transmitted from the driving member $a$ to the driven member $b$ through the sun and planet or epicyclic mechanism above described with a gradually variable ratio which is determined by the pumps $d$, $e$. Assuming the swash plates $i$, $r$, to be in the position shown in Figure 1, $r$ being at right angles to the axis of the mechanism and $i$ at its maximum inclination, it will be apparent no displacement of the plungers $h$ can occur as liquid cannot in this condition be displaced from the cylinder block $f$ to the cylinder block $o$, and consequently the block $f$ will be held against rotation. The block $o$ is however free to be rotated by the epicyclic mechanism as rotation of this block (with the swash plate $r$ in the position shown) involves no displacement of liquid between the two blocks $o$, $f$. With the sun pinion $z$ held stationary by the cylinder block $f$, the driven shaft $b$ will be driven at a lower rate than the driving member $a$, and meanwhile the cylinder block $o$ will be rotated idly by the sun pinion $x$.

Assuming the relative positions of the swash plates $i$, $r$, to be reversed, the plate $i$ being arranged at right angles to the axis of the mechanism and the plate $r$ moved (by a counter-clockwise rotation) to its position of maximum obliquity, the sun pinion $x$ will be held against rotation, and the shaft $b$ will be driven at a higher rate than the driving member $a$, the cylinder block $f$ being meanwhile rotated idly by the sun pinion $z$.

By varying the relative inclinations of the two swash plates $i$, $r$, so that liquid displacement can occur between the pumps $d$, $e$, under the action of the plungers $h$, $q$, thereby enabling both cylinder blocks $f$, $o$, to rotate, any desired relative rotation of the two sun pinions $x$, $z$ can be produced (between the limits attainable with the swash plates in the two positions above described) with corresponding variations of the speed ratio between $a$ and $b$. When the swash plates $i$, $r$, are situated at equal and opposite inclinations, the elements of the epicyclic mechanism rotate en bloc, and the members $a$, $b$, then rotate at equal speeds.

By the combination of an epicyclic mechanism, and complementary pumps operating as above described, the speed ratio of the driving and driven shafts is gradually variable by any desired amount within the limits for which the mechanism is designed.

When the relative inclinations of the two swash plates $i$, $r$, are such that liquid displacement occurs between the pumps $d$, $e$, liquid passes from one of the pumps to the other through one of the ports $v$ at a high pressure determined by the load on the driven shaft $b$, and returns through the other of these ports at a relatively low pressure. Moreover, the relative inclinations of the swash plates $i$, $r$, determine which of the two pumps $d$, $e$, causes the displacement of liquid under high pressure, and which of the two ports $v$ is traversed by the high pressure liquid.

Figure 6:
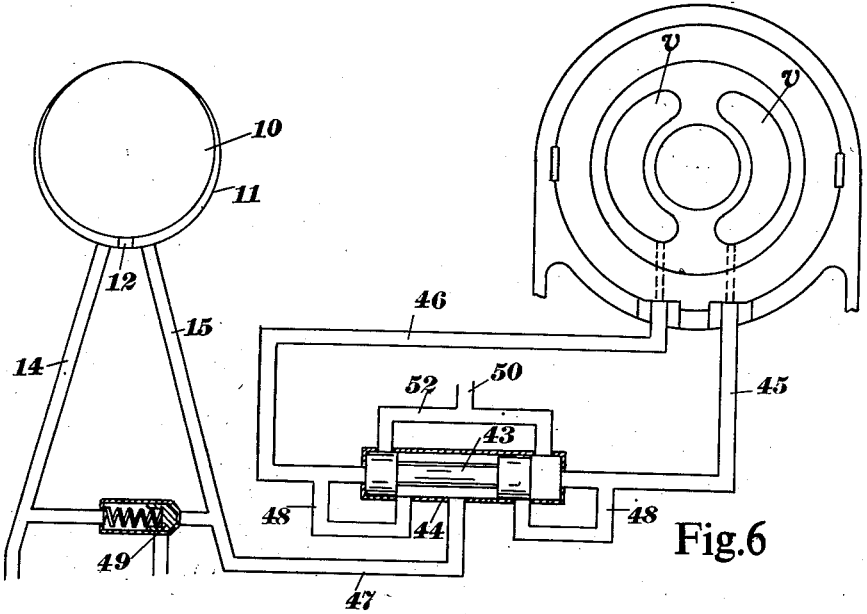
Figure 6 is a diagram illustrating means by which the pumps are maintained in a fully charged condition.

Under working conditions some slight leakage of liquid past the plungers $h$, $q$ and the abutment $k$ is unavoidable, and this is compensated by any convenient pump. The latter may consist as shown of an eccentric rotor $10$ secured to the sleeve $y$ and contained in a chamber $11$ within the casing $c$, and co-operating with a radially situated slidable vane $12$ held in contact with the periphery of the rotor by a spring $13$. In communication with the rotor chamber $11$ at one side of the vane $12$ there is formed in the casing $c$ a liquid inlet passage $14$ which serves to connect the rotor chamber to a sump $16$ formed by the lower part of the casing. At the other side of the vane $12$ the rotor chamber $11$ communicates with a liquid delivery passage $15$ also formed in the casing $c$. From the delivery passage $15$ liquid for replenishing the pumps $d$, $e$, can be supplied alternately to the two ports $v$ in the abutment $k$ under the control of a reciprocatory piston valve $43$ (see Figure 6). For enabling the valve $43$ to be actuated automatically in response to the difference in the pressure at which liquid is displaced from either of the pumps $d$, $e$, to the other and the pressure at which this liquid is returned, the valve is slidable in a cylinder $44$ which at one end is connected by a pipe $45$ to one of the ports $v$, and at the other end is connected by a pipe $46$ to the other of these ports. Also the valve $43$ is provided as shown with a reduced intermediate portion and the annular space in the cylinder $44$ around this reduced portion communicates with the delivery passage $15$ through another pipe $47$. Moreover the pipes $45$, $46$ are each provided with a branch $48$ which is adapted to communicate with the cylinder $44$ under the control of the adjacent end of the valve $43$, the latter when in either of its extreme positions serving to establish communication between one of the branches and the pipe $47$, and to close the other branch. When the mechanism is in operation the pipes $45$, $46$ and $47$, the branches $48$, and the parts of the cylinder $44$ not occupied by the valve $43$ are full of liquid. Moreover the valve $43$ is movable between its extreme positions in response to the pressure difference above mentioned for interrupting communication between the delivery passage $15$ and either of the abutment ports $v$, and for establishing communication between the delivery passage and the other abutment port, the arrangement being such that while high pressure liquid is traversing either of the said ports this port is isolated from the delivery passage and replenshing liquid can flow to the other port only. Any convenient pressure relief valve as $49$ may be provided for the liquid in the delivery passage $15$.

To maintain a fluid-tight contact between the adjacent end faces of the cylinder blocks $f$, $o$, and abutment $k$, the latter is non-rotatably but slidably mounted in the casing $c$ between the adjacent bearings $m$, $t$, of the blocks, and liquid pressure is exerted endwise on the block $f$. For enabling such pressure to be exerted there is provided in the casing c an annular chamber 7 containing a slidable piston-like packing 8 which bears against one side of an annular member 9 carrying the bearing n of the block f. Liquid under pressure is supplied to the chamber 7 from a pipe 50 (Figure 6) which communicates with either of the abutment ports v under the control of the valve 43. The pipe 50 communicates with another pipe 52 which at its opposite ends is connected to the cylinder 44 and controllable by the valve 43, these pipes and the annular chamber 7 being full of liquid, and the arrangement being such that while high pressure liquid is traversing either of the abutment ports v, this port is in communication with the said annular chamber and the other port is isolated from the said chamber.

As previously indicated any convenient means may be employed for adjusting the inclination of the swash plate r, but I prefer to employ for this purpose the hydraulic means shown in Figure 3 and 3a. Such means comprise a hollow member 17 which is journalled in a bearing 18 on the casing c, and which at its inner end accommodates one of the trunnions s on the swash plate r, this trunnion having a splined connection with the hollow member. The outer end of the hollow member 17 is formed at diametrically opposite positions with a pair of longitudinally arranged segmental projections 19 which are accommodated in segmental recesses 20 formed longitudinally in an enlargement 21 of the outer end of the bearing 18, the arcuate peripheral surfaces of the projections fitting closely against the corresponding surfaces of the recesses, and the latter being sufficiently wider than the projections to permit angular movements of the hollow member 17 between limits determined by contact of the sides of the projections with the sides of the recesses. Near its outer end the hollow member 17 is formed with two pairs of diametrically opposite ports 22 situated in planes at right angles to each other. One pair of the ports 22 communicate respectively with the recesses 20 at one side of the projections 19, and the other pair of the ports communicate respectively with the recesses at the other side of the projections, the arrangement being such that liquid admitted under pressure to the recesses through either pair of the ports and released through the other pair causes angular movement of the hollow member 17 for varying the inclination of the swash plate r. For controlling the flow of liquid to and from the recesses 20, a rotatable control member 24 is mounted in a cover 25 closing the outer end of the bearing enlargement 21. The control member 24 extends into and fits closely the adjacent portion of the hollow member 17, and is formed in the vicinity of the ports 22 with two pairs of peripheral recesses 26, 26¹ disposed at 90° apart, these recesses being separated by lands 27 slightly wider than the diameter of the ports. One oppositely situated pair (26) of the recesses communicate through passages 28 in the control member 24 with a liquid inlet pipe connection 29 on the cover 25, and the other pair (26¹) of these recesses communicate through additional passages as 30 in the control member with the outer end of an axial passage 31 in the adjacent trunnion 3, the inner end of the latter passage being in communication with the interior of the casing c.

When the mechanism is in use the parts of the segmental recesses 20 not occupied by the projections 19 are full of liquid, and liquid under pressure is supplied to the pipe connection 29 from any convenient pump, which may be the replenishing pump (10, 11) above described. In the initial position of the control member 24 the lands 27 close the adjacent ends of the ports 22 in the hollow member 17 as shown in Figure 3a, and the liquid thus trapped in the segmental recesses 20 serves as a hydraulic lock for preventing angular movement of the swash plate r. The control member 24 is movable angularly to and from its initial position by any convenient means which in the form illustrated comprises a toothed rack 32 slidably supported by the cover 25 and engaging a pinion 33 on the control member, the rack being operable by the driver of the vehicle. By moving the control member 24 to either side of its initial position liquid under pressure is admitted to the segmental recesses 20 at one side of the projections 19, and the liquid in these recesses at the other side of the projections is released. The effect of this is to cause the hollow member 17 together with the swash plate r to move in the same direction and to the same extent as the control member 24, whereupon the lands 27 again close the adjacent ends of the ports 22 for causing the hollow member and swash plate to be locked in the new position by the liquid trapped in the recesses 20.

Means similar to those above described for adjusting the inclination of the swash plate r are also employed for adjusting the inclination of the other swash plate i.

Preferably and as shown each of the swash plates i, r is composed of a pair of coaxially arranged annular parts 34 and 35 mounted one within the other and having a ball or roller bearing 36 arranged between them, the inner part being adapted to co-operate with the plungers of the corresponding pump, and being rotatable relatively to the outer part which is pivoted to the casing c as above described.

The form of the epicyclic gear and the manner in which it is connected to the pumps may be varied in a variety of ways, some of which will now be described with the aid of the diagrams shown in Figures 7 to 11 in which the same or analogous parts are indicated by the same reference characters as those employed in Figures 1 to 6 with the addition of distinguishing indices.

Figure 7:
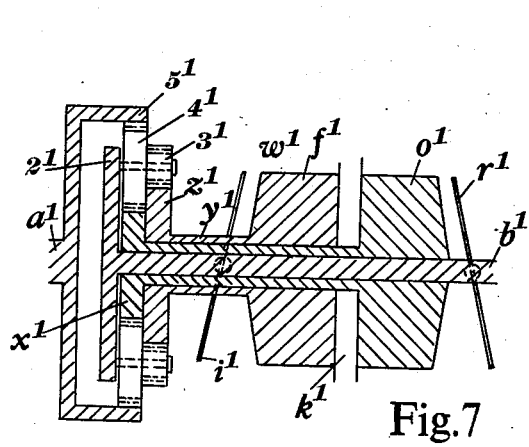
Figures 7-11 are respectively diagrammatic representations illustrating different alternative embodiments of the invention shown in Figures 1-5.

The example shown in Figure 7 is similar to that shown in Figure 1 with the exception that the planet pinions 4¹ are in direct engagement with the smaller sun pinion $x^1$ instead of being connected thereto through the intermediary of additional planet pinions. When the sun pinion $z^1$ is locked the driven shaft is rotated at a lower speed than the driving shaft. Also when the sun pinion $x^1$ is locked the driven shaft is rotated at a lower speed than the driving shaft, but faster than when the sun pinion $z^1$ is locked. Between these limits the speed ratio is gradually variable by variation of the inclinations of the swash plates.

Figure 8:
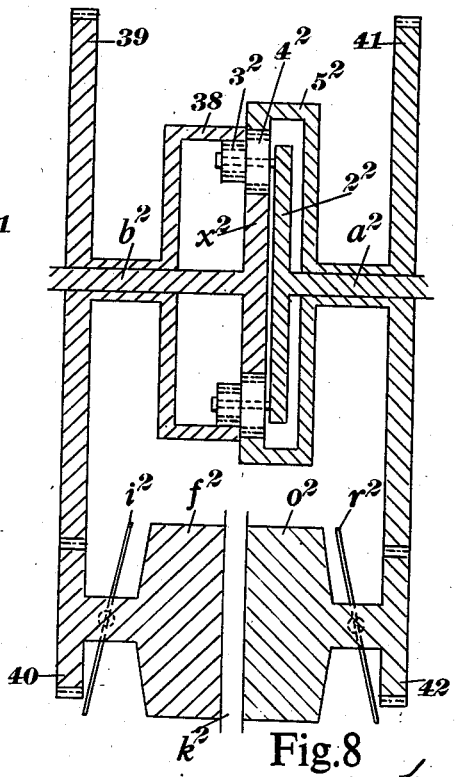

The example shown in Figure 8 is suitable for use when it is desirable to mount the cylinder blocks $f^2$ and $o^2$ on an axis spaced from and parallel with that of the driving and driven members $a^2$, $b^2$. In this example the adjacent ends of the latter members are respectively provided with a planet carrier $2^2$ and a sun pinion $x^2$, and on the planet carrier are mounted a plurality of twin planet pinions $3^2$, $4^2$ of different diameters. The smaller pinions $3^2$ engage an internally toothed annulus $38$ secured to a gear wheel $39$, the latter being freely mounted on the driven member $b^2$, and being in engagement with another but smaller toothed wheel $40$ secured to and coaxial with the cylinder block $f^2$. The larger pinions $4^2$ engage the sun pinions $x^2$ and an internally toothed annulus $5^2$ secured to a gear wheel $41$. The gear wheel $41$ is freely mounted on the driving member $a^2$ and is in engagement with another gear wheel $42$ (of the same diameter as the toothed wheel $40$) secured to and coaxial with the cylinder block $o^2$.

In all of the examples above described both of the coaxially arranged pumps are capable of rotation relatively to the driven member. But this is not an essential condition as one of these pumps may be secured to the driven member as shown in any of Figures 9 to 11.

Figure 9:
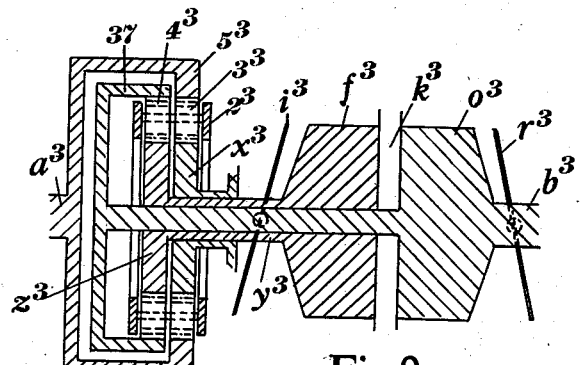

In the example shown in Figure 9 the cylinder block $o^3$ is secured on the driven shaft $b^3$ which at the end adjacent to the driving member $a^3$ has secured to it an internally toothed annulus $37$ of the same diameter as the internally toothed annulus $5^3$ on the driving member. The other cylinder block $f^3$ is secured to one end of a hollow shaft $y^3$ which is rotatable on the driven shaft $b^3$ and which at its other end is formed or provided with a sun pinion $z^3$. Arranged coaxially with and adjacent to the sun pinion $z^3$ is another sun pinion $x^3$ of the same diameter, the latter sun pinion being fixed. Arranged between and in engagement with the toothed annuli $5^3$, $37$ and the sun pinions $x^3$, $z^3$ are twin pinions $3^3$, $4^3$ mounted on a rotary carrier $2^3$. When the swash plate $i^3$ is at right angles to the axis, and the swash plate $r^3$ is inclined, the pump body $o^3$ and driven shaft $b^3$ cannot rotate. The rotation of the driving member $a$ thus results in idle rotation of the planet pinions, the sun pinion $z^3$ and pump $f^3$. When the swash plate $r^3$ is at right angles, and the swash plate $i^3$ is inclined, the sun pinion $z^3$ is locked and the driven shaft (with pump body $o^3$) is rotated at the same speed as the driving shaft. Variation of speed ratio within the limits provided by this arrangement of gearing and pumps is effected by appropriate adjustment of the swash plates.

Figure 10:
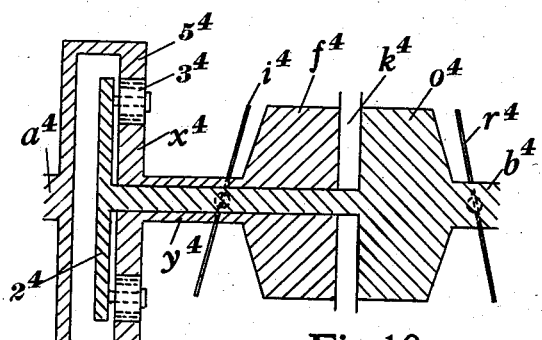

In the example shown in Figure 10 the cylinder block $o^4$ is secured on the driven shaft $b^4$ which at the end adjacent to the driving member $a^4$ has secured to it a planet carrier $2^4$. The other cylinder block $f^4$ is secured to one end of a hollow shaft $y^4$ which is rotatable on the driven shaft $b^4$ and which at its other end is formed or provided with a sun pinion $x^4$. In engagement with the sun pinion $x^4$ are planet pinions $3^4$ which are mounted on the carrier $2^4$, and which also engage an internally toothed annulus $5^4$ on the driving member $a^4$. The mode of operation of this arrangement is similar to that of Figure 9, in that the required variations of speed ratio within the limits of the mechanism are obtained by appropriate adjustment of the swash plates.

Figure 11:
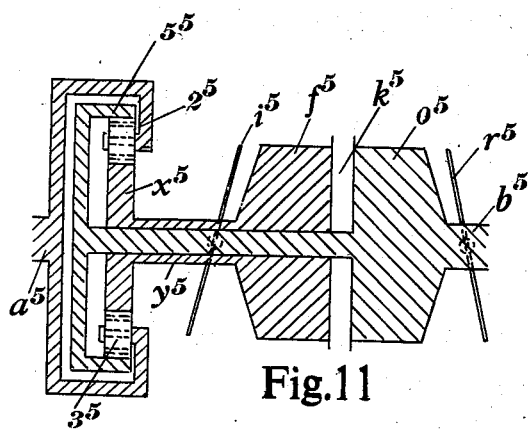

The example shown in Figure 11 is similar to that shown in Figure 10 with the exception that the positions of the internally toothed annulus $5^5$ and planet carrier $2^5$ are interchanged, that is to say the toothed annulus is secured to the driven member $b^5$ and the planet carrier is secured to the driving member $a^5$. Here again the mode of operation for effecting the required variations of speed ratio is similar to that of Figure 9 or 10.

The invention is not limited to the examples above described and from these examples it will be apparent that the invention is capable of being carried out in many different ways. But in all cases there is employed an epicyclic gearing, and the control of the speed ratio between the driving and driven members is effected by a pair of pumps of the kind specified connected to two appropriate parts of the epicyclic gearing. Further the terms "driving" and "driven" used in the above descriptions may be interchanged, the parts described as driving members being thus driven members, and the parts described as driven members being driving members, and I wish it to be understood that these terms are used in this sense.

Having thus described my invention what I claim as new and desire to secure by Letters Patent is:

1. A variable-speed mechanism having in combination an epicyclic gearing, a pair of complementary pumps each comprising a rotary body part provided with a plurality of bores, and reciprocatory plungers in the bores, a ported non-rotatable abutment situated between and in contact with adjacent end faces of the pump body parts, the said body parts being rotatable relatively to and arranged coaxially with each other, and angularly adjustable swash plates co-operating with the outer ends of the plungers for varying the strokes of the latter, one of the pumps being associated with one part of the epicyclic gearing and the other pump with another part of the gearing.

2. A variable speed mechanism as claimed in claim 1, in which the abutment is provided with a pair of kidney-shaped ports which at their ends are separated from each other by distances of the order of the diameter of the plunger bores in the pump body parts.

3. A variable speed mechanism as claimed in claim 1 and having in combination means for supplying replenishing liquid to the pumps, and a valve responsive to the difference in the pressures developed by the pumps for automatically connecting the said means to the pump region of lower pressure, the said difference being determined by the positions of the swash plates.

4. A variable speed mechanism as claimed in claim 1 and having in combination means for supplying replenishing liquid to the pumps, and a valve responsive to the difference in the pressures developed by the pumps for automatically connecting the said means to the pump region of lower pressure, the said difference being determined by the positions of the swash plates, and the said means consisting of a rotary pump embodied in and operatively associated with a rotatable part of the mechanism.

5. A variable speed mechanism as claimed in claim 1 and having in combination means for supplying replenishing liquid to the pumps, a valve responsive to the difference in the pressures developed by the pumps for automatically connecting the said means to the pump region of lower pressure, the said difference being determined by the position of the swash plates, and piston-like means which is associated with and through which hydraulic pressure can be exerted endwise on one of the pump body parts, the said piston-like means being controlled by the valve associated with the liquid replenishing means.

6. A variable speed mechanism as claimed in claim 1 and having a driving member connected to one part of the epicyclic gearing, and a driven member connected to another part of the said gearing, the body parts of the two pumps being capable of rotation relatively to both the driving and driven members and being connected to other parts of the gearing.

7. A variable speed mechanism as claimed in claim 1 and having a driving member connected to one part of the epicyclic gearing, and a driven member connected to another part of the said gearing, one of the pump body parts being secured on one of the driving and driven members, and the other of the pump body parts being rotatable relatively to both the driving and driven members and being connected to a third part of the gearing.

RICHARD JOSEPH IFIELD.